United States Patent [19]

Borrill

[11] Patent Number: 5,588,131
[45] Date of Patent: Dec. 24, 1996

[54] SYSTEM AND METHOD FOR A SNOOPING AND SNARFING CACHE IN A MULTIPROCESSOR COMPUTER SYSTEM

[75] Inventor: Paul L. Borrill, Cupertino, Calif.

[73] Assignee: Sun Microsystems, Inc., Mountain View, Calif.

[21] Appl. No.: 208,170

[22] Filed: Mar. 9, 1994

[51] Int. Cl.⁶ ........................................... G06F 13/00
[52] U.S. Cl. ................ 395/473; 395/446; 395/468; 395/470; 364/243.41; 364/243.44; 364/964.6; 364/DIG. 1; 364/DIG. 2
[58] Field of Search ........................ 395/446, 468, 395/470, 473

[56] References Cited

U.S. PATENT DOCUMENTS

| | | | |
|---|---|---|---|
| 5,113,510 | 5/1992 | Hillis | 395/448 |
| 5,282,272 | 1/1994 | Guy et al. | 395/275 |
| 5,325,503 | 6/1994 | Stevens et al. | 395/473 |
| 5,369,753 | 11/1994 | Tipley | 395/449 |
| 5,388,224 | 2/1995 | Maskas | 395/325 |

FOREIGN PATENT DOCUMENTS

WO92/20027  11/1992  WIPO.

OTHER PUBLICATIONS

"Design and Implementation of an Integrated Snooping Data Cache" by Gaetano Borriello et al., Sep. 1984, pp. 1–89, Computer Science Division University of California–Berkley.

Primary Examiner—Frank J. Asta
Attorney, Agent, or Firm—Leland Z. Wiesner

[57] ABSTRACT

An improved multiprocessor computer system with an improved snarfing cache is disclosed. The multiprocessor system includes a main memory, I/O interface, and a plurality of processor nodes. Each processor node includes a CPU, and a cache. A shared interconnect couples the main memory, I/O interface, and the plurality of processor nodes. The snarfing cache of each processor node snarfs valid data that appears on the shared interconnect, regardless of whether the cache of the processor node has an invalid copy or no copy of the data. The net effect is that each processor node locally caches additional valid data, resulting in an expected improved cache hit rate, reduced processor latency, and fewer transactions on the shared interconnect.

28 Claims, 3 Drawing Sheets

SYSTEM AND METHOD FOR A SNOOPING AND SNARFING CACHE IN A MULTIPROCESSOR COMPUTER SYSTEM

BACKGROUND OF THE INVENTION

1. Field of the Invention

The present invention relates to multiprocessor computer systems, and more particularly, to an improved snarfing cache.

2. Description of the Prior Art

A multiprocessor computer system includes a main memory, an input/output (I/O) interface, and several processors (CPUs), each CPU including a cache. A shared interconnect couples the CPUs, main memory, and the I/O interface. Shared memory multiprocessor systems require a mechanism for maintaining cache coherency, i.e., all valid copies of a block of data stored in the various caches of the multiprocessor system must have identical values. Without cache coherency, data consistency problems can arise. For example, if two CPUs locally cache the same data block, and one CPU updates the data block without informing the second CPU, then an inconsistent state exists. If the second CPU performs an operation involving the out of date data (invalid) in its local cache, an incorrect result may be obtained.

A snooping cache is a cache coherency mechanism used to avoid inconsistency in the data stored in the various caches of the multiprocessor system. The snooping cache includes a monitor for monitoring the transactions that occur on the shared interconnect. When a first CPU places a modified data block on the shared interconnect, for example during a write back to main memory, the other caches in the system monitor the transaction, and either invalidate or update any local copies of the data block, depending on the type of snooping cache. As a result, cache coherency is maintained. The problems associated with invalidate and update type snooping caches, are discussed below.

With invalidate type snooping caches, CPU latency is a problem. Latency is the time a CPU remains idle while requested data is retrieved. Consider a first processor (CPU 1) and a second processor (CPU 2), both with a valid copy of block A. If CPU 2 modifies block A, a broadcast is sent out on the shared interconnect and CPU 1 invalidates its copy of block A. If, subsequently, CPU 1 needs a valid copy of block A, CPU 1 must first request a valid copy of block A by initiating a transaction on the shared interconnect. Either another CPU with a valid copy of Block A, or main memory, responds by sending a copy of block A to CPU 1. During the request and response period, CPU 1 is latent, reducing the processing throughput of the multiprocessor system.

With the update type of snooping cache, CPU latency is partially reduced. Whenever one CPU places a valid copy of block A on the shared interconnect, the other CPUs with an invalid copy of block A may "snarl" the valid copy off the shared interconnect and update its cache. For example, if CPU 1 has an invalid copy of block A, and CPU 2 places a valid copy of block A on the shared interconnect before CPU 1 requests the data, CPU 1 will snarl the data. Subsequently, when CPU 1 needs block A, the request and response transaction described above is not required. As a result, if CPU 1 later needs block A, CPU 1 is not latent and traffic on the shared interconnect is reduced.

The prior art update snarfing mechanism, although beneficial in the above example, has its limitations. Snarfing occurs only when a CPU has an invalid copy of a particular data block appearing on the shared interconnect. If CPU I updates block A and then places it on the shared interconnect, and if CPU 2 does not have a copy of block A, then block A is not snarled by CPU 2. When CPU 2 later requests a copy of block A, the above described request response transaction on the shared interconnect is required. Thus, the CPU latency and traffic on the shared interconnect are exacerbated.

The prior an updating snooping cache is less than ideal in the multithreaded multiprocessing environment. Threading is the dividing of a single process into a plurality of related subprocesses or threads. Each thread is executed on one CPU in the multiprocessor system. The threads are interleaved due to the fact that they are derived from the same process, and, therefore, share instructions, files, data and other information. The situation outlined above is a common occurrence in threaded computer environments. Often, a first CPU executing a first thread will place data on the shared interconnect. If another CPU, executing a related thread, has no copy of that block, then snarfing does not take place.

SUMMARY OF THE INVENTION

The present invention discloses a multiprocessor computer system with an improved updating snooping cache. The multiprocessor system includes a main memory, an I/O interface, and a plurality of processor nodes. Each processor node includes a CPU, and a cache. A shared interconnect couples the main memory, I/O interface, and the plurality of processor nodes.

According to one embodiment of the present invention, the cache of each processor node provides locally cached data to the CPU and snarls all data appearing on the shared interconnect, regardless of whether the cache has an invalid copy or no copy of the data. For example, if a processor node has an invalid copy of the data, the cache is updated. If the processor node has no copy of the data, the data is snarfed and placed in the cache of the CPU of the processor node. If the first processor node already has a valid copy of the data in its cache, then updating or snarfing of the data does not take place.

In another embodiment, the cache of each processor node selectively snarls data appearing on the shared interconnect in order to save storage space in the snarfing cache. A processor node is programmed to selectively snarl data with a specific label or labels appearing on the shared interconnect. Data appearing on the shared interconnect with a different label is not snarled.

The selection of data to be snarled by a processor node is user defined and may come from any source in the multiprocessor computer system. One processor node may selectively snarl only the data placed on the shared interconnect by another specific processor node. A processor node can be programmed to snarl all the data appearing on the shared interconnect from one or more specific memory pages in main memory. In a multithreaded environment, related threads derived from the same process can be assigned the same label. The two processor nodes are programmed to snarl data having that same label. As a result, one processor node snarfs the data generated by the other processor node. A processor node may also be programmed to snarl data on the shared interconnect as a result of a direct memory access (DMA) by an input/output device or data sent to a frame buffer. Any other relevant selection criteria may be used to snarl data off the shared interconnect.

The improved snarfing cache of the present invention provides many advantages. The amount of relevant data stored in the local caches of the processor nodes, especially when a snarfing selection criteria is used, tends to be increased. Thus, the cache miss rate is improved, and the processor node latency and the number of shared interconnect transactions are significantly reduced. As an additional benefit, the reduced traffic on the shared interconnect permits the use of a less expensive, smaller bandwidth, shared interconnect.

DESCRIPTION OF THE DRAWINGS

The objects, features and advantages of the system of the present invention will be apparent from the following description in which.

DESCRIPTION OF THE PREFERRED EMBODIMENT

Figure 1:
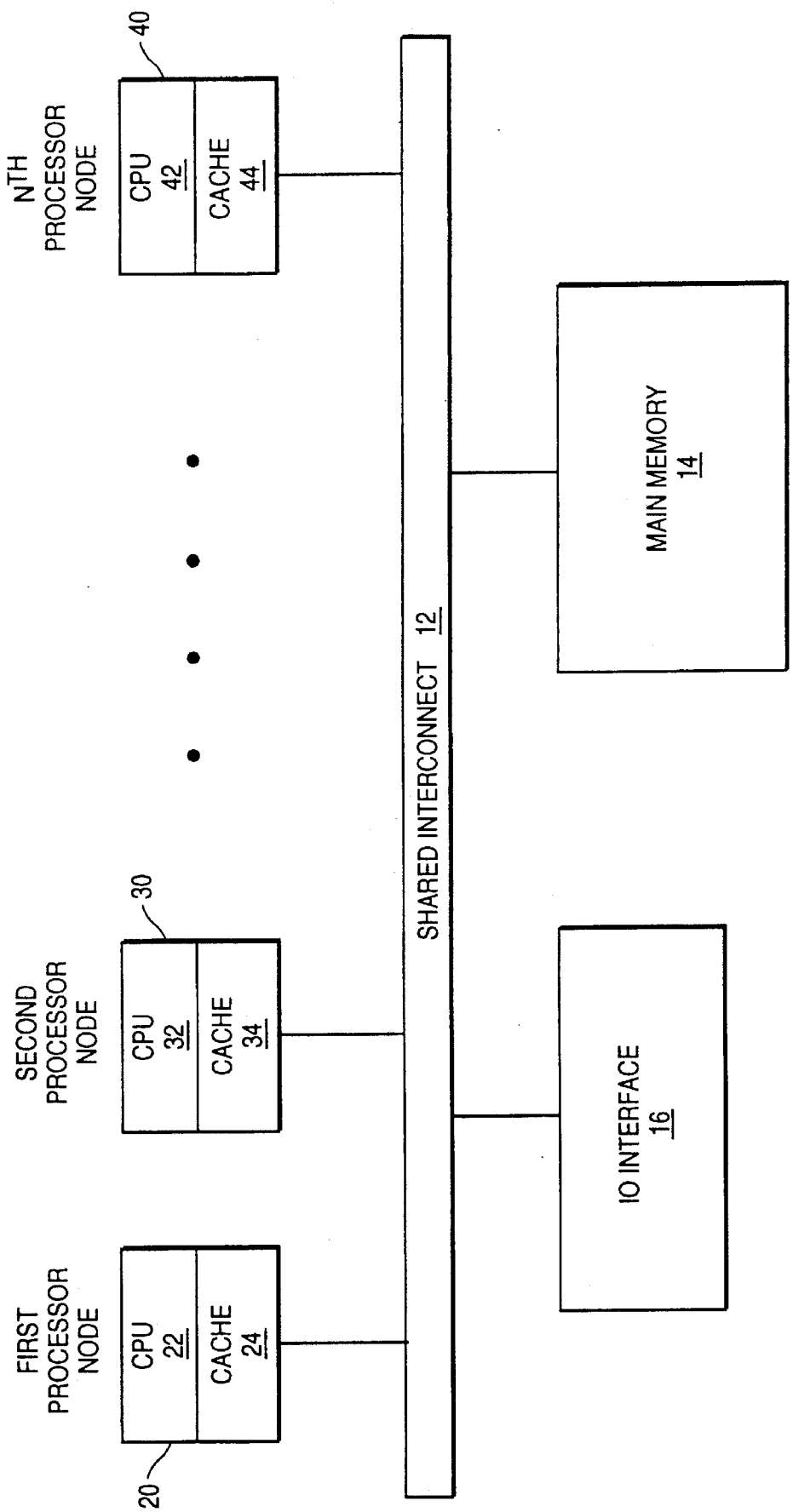
FIG. 1 illustrates a multiprocessor system wherein each processor node has an improved snarfing cache according to the present invention.

Referring to FIG. 1, a multiprocessor system with an improved snarfing cache according to the present invention is shown. The multiprocessor system 10 includes a shared interconnect 12, a main memory 14, I/O interface 16, and a plurality of (N) processor nodes 20, 30, and 40. Processor node 20 includes a first processor CPU 22 and cache 24. Processor node 30 includes a second CPU 32 and cache 34. Processor node 40 includes an Nth processor CPU 42 and cache 44. The main memory 14, I/O interface 16, and processor nodes, 20, 30 and 40 are coupled together by the shared interconnect 12. Since the operation and transactions of the shared interconnect 12, main memory 14, I/O interface 16, and the CPUs 22, 32 and 42 in processor nodes 20, 30, and 40 respectively are all well known in a multiprocessor environment, a detailed description is not provided herein. See for example, "Design and Implementation of An Integrated Snooping Data Cache", G. Borriello, et al., Computer Science Division, University of California, Berkeley, Calif., Report No. UCB/CSD 84/199, September 1984, incorporated by reference herein.

According to one embodiment of the present invention, the caches 24, 34 and 44 of processor nodes 20, 30, and 40 respectively are arranged to snarf all data appearing on the shared interconnect 12. For example, the cache 24 of the first processor node 20 provides locally cached data previously used or requested by CPU 22. The cache 24 also snarfs all data appearing on the shared interconnect 12, regardless of whether the cache 24 has an invalid copy or no copy of the data. If the cache 24 of first processor node 20 has an out-of-date copy of the data appearing on the shared interconnect 12, the cache 24 is updated. If the cache 24 of first processor node 20 has no copy of the data appearing on the shared interconnect 12, the data is snarfed and placed in the cache 24. If the cache 24 of first processor node 20 already has a valid copy of the data in its cache, then updating or snarfing of the data is not necessary. The other processor nodes 30 through 40 in the multiprocessor system 10 operate in a similar manner. In contrast, in the prior art, snarfing occurs only when the CPU in question has an invalid copy of the data on the shared interconnect.

By snarfing all data appearing on the shared interconnect 12, each processor node 20, 30 and 40 locally caches more valid data. When one of the processor nodes 20, 30, 40 requests such data, that data is immediately provided by caches 24, 34, 44 respectively. Thus, the latency of CPU 22, CPU 32 and CPU 42 is reduced. As an additional benefit, the number of transactions on the shared interconnect are also reduced because there is no need to perform a transaction on the shared interconnect 12 if the data has already been snarfed and resides in the local cache 24, 34, 44 of the requesting processor node 20, 30, 40 respectively.

In another embodiment of the present invention, the caches 24, 34, and 44 of processor nodes 20, 30 and 40 respectively snarf only selected data appearing on the shared interconnect 12 according to a user defined selection criteria. A processor node 20, 30 and 40 is programmed to selectively snarf data appearing on the shared interconnect 12 with a specified label. Data appearing on the shared interconnect 12 with a different label is not snarfed. For example, processor node 20 can be programmed to selectively snarf data appearing on the shared interconnect 12 with a specified label "X". All data with a different label, is not snarfed.

The selection of data to be snarfed by a processor node 20, 30, 40 is user defined. For example, one processor node 20, 30, or 40 may selectively snarf the data placed on the shared interconnect by another processor node 20, 30, or 40. For example, processor node 20 and processor node 30 may both be programmed to insert a label "X" on all data each places on the shared interconnect 12. As a result, data placed on the shared interconnect by processor node 20 is snarfed by processor node 30, and vice versa, based on this common label. In another example, a processor node can be programmed to snarf all the data appearing on the shared interconnect from one or more specific pages or locations in main memory 14. In another example useful in a multi-threaded processing environment, two processor nodes, for example 20 and 30, executing two threads from the same process, may place the same label on the shared interconnect. As a result, the data generated by one processor node 20 or 30 is snarfed by the other processor node 20 or 30 respectively. In other examples, data resulting from a direct memory access (DMA) by an input/output device may be snarfed. Data sent to a frame buffer may be snarfed. In summary, any data generated in the multiprocessor system 10 and any relevant selection criteria may be used to snarf data off the shared interconnect.

Figure 2:
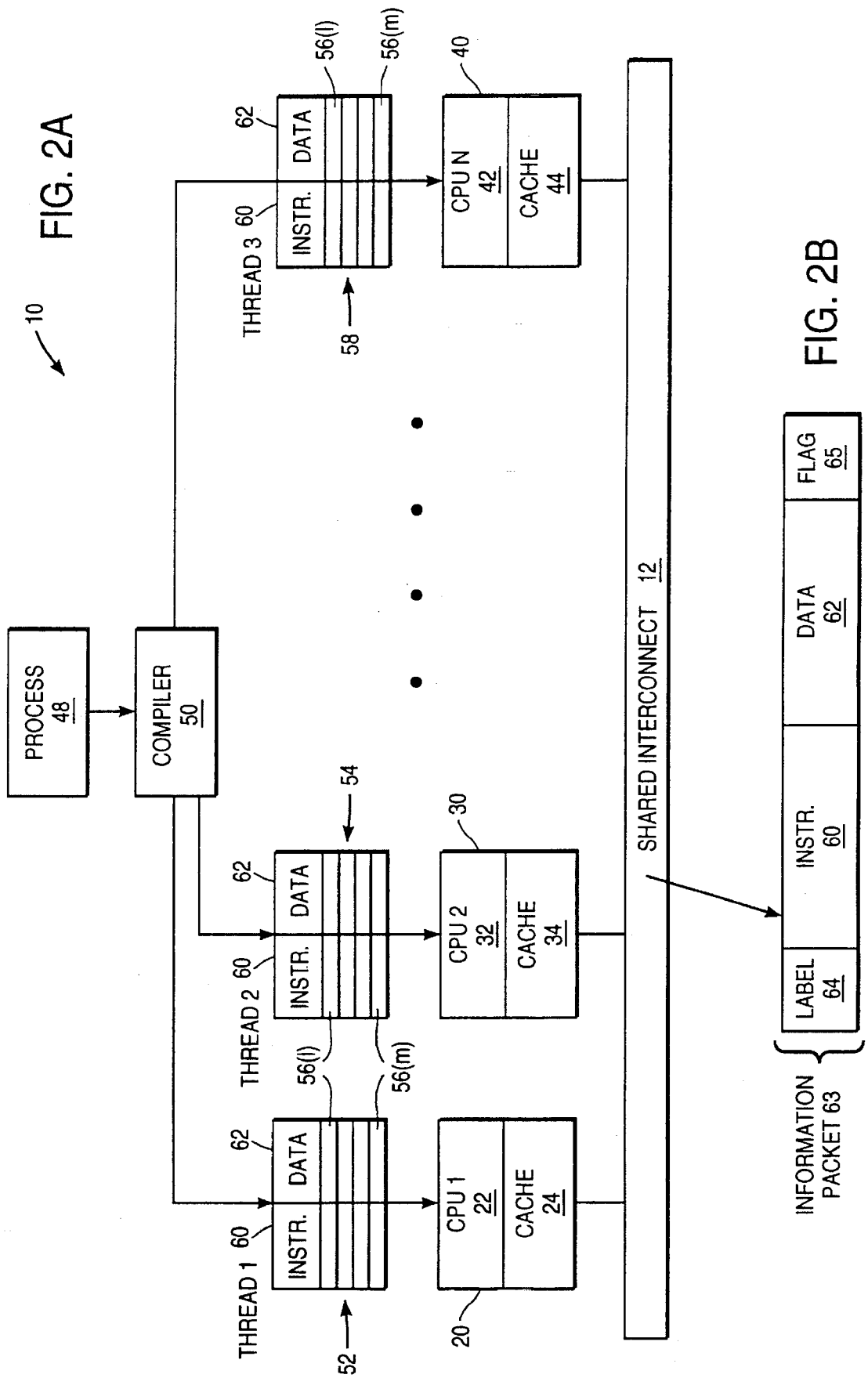
FIG. 2 illustrates the multiprocessor system operating in a threaded environment according to the present invention.

Referring to FIG. 2A, operation of the present invention is illustrated in a multi-threaded multiprocessor system environment. (Note, main memory 14 and I/O interface 16 have been removed for clarity.) In this environment, a compiler 50 of the multiprocessor system 10 divides a large process 48 into a first thread 52 to be executed by processing node 20 and a second thread 54 to be processed by processing node 30. Each thread includes a sequence of instructions $56_{(1)}$ through $56_{(m)}$. Each instruction 56 may include either an "Instruction" field 60, a "Data" field 62, or both, as the case may require.

Referring to FIG. 2B, an information package 63 as it appears on the shared interconnect 12 is shown. The information package 63 includes a label field 64, the instruction field 60, the data field 62, and the flag field 65, or a combination thereof. The label field 64 includes one or more bits used to label the instruction 56 in accordance with one of the above-defined criteria.

Since the two threads 52 and 54 are derived from the same process 48, there is a strong likelihood that the two threads 52 and 54 will be highly interleaved and will need much of the same instructions and data. To take advantage of this commonality, processor node 20 and processor node 30 may be programmed to place a label "X" in field 64 of each information package 63 it places on the shared interconnect 12 while executing threads 52 and 54 respectively and to snarf information packages 63 off the shared interconnect 12 based on the same. For example, when processor node 20 places valid data on the shared interconnect 12, it is identified with label X in the label field 64. If processor node 30 has no copy or an invalid copy of that data, the data is snarfed by cache 34 based on the label X. If processor node 30 already has a valid copy of the data, no action is taken. Conversely, when processor node 30 places valid data designated by label X on the shared interconnect 12, the cache 24 of processor node 20 snarfs the data in a similar manner.

In the above example, processor node 40 may be programmed to place a label "Y" in field 64 of each information packet it places on the shared interconnect 12. Since the thread 58 is unrelated to threads 54 and 52, the data placed on the shared interconnect 12 by the processor nodes 20 and 30 respectively is ignored by processor node 40, and vice versa, because of the mismatch of the labels. Accordingly, the processor nodes 20, 30 and 40 may be programmed to selectively snarf or not snarf data appearing on the shared interconnect 12. In the event processor node 20 or 30 data identified with a Y label, or processor node 40 needs data with a label X, a specific need transaction is initiated to obtain the data over the shared interconnect 12.

By snarfing select data off the shared interconnect 12, each processor node 20, 30 and 40 locally caches more relevant valid data. Based on the principals of spatial and temporal locality, there is a high probability that the processor nodes 20, 30, and 40 will need this selected data, especially in a multiprocessor environment where multiple threads are derived from the same process. Thus, the latency of CPU 22, CPU 32 and CPU 42 respectively, and the number of transactions on the shared interconnect 12, are significantly reduced. In the aggregate, this significantly reduces the number of request response transactions on the shared interconnect 12 and the overall processing throughput of the multiprocessor system 10 is greatly improved. Although this mechanism may result in the snarfing of irrelevant data, such data may be removed from the cache using a replacement algorithm, such as last recently used (LRU), first-in-first-out, or random. In contrast, in the prior art, snarfing occurs only when the CPU in question has an invalid copy of the data on the shared interconnect.

Figure 3:
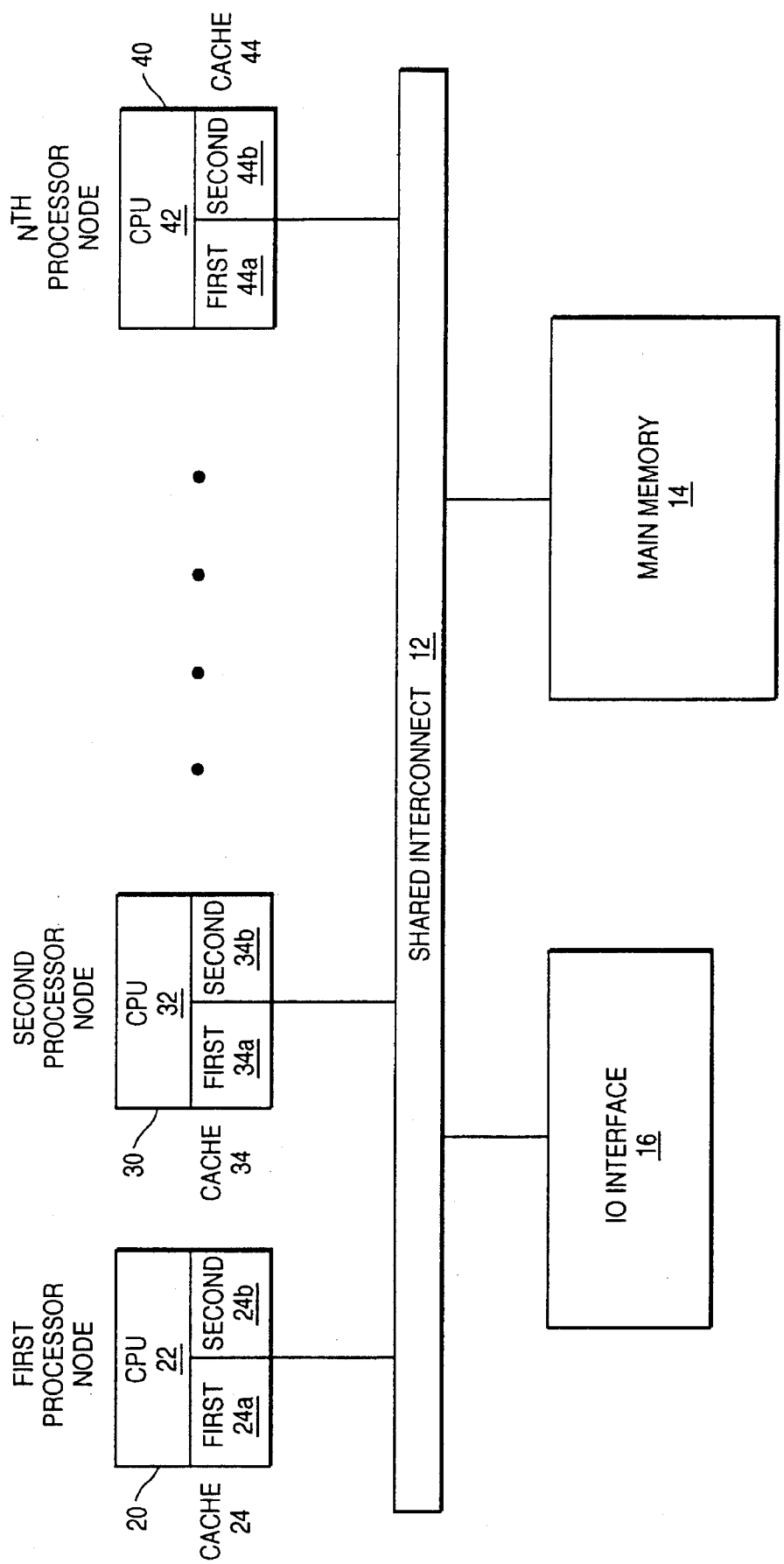
FIG. 3 illustrates a multiprocessor system wherein each processor node has a first cache segment for providing data to the processor node and a second cache segment for snarfing data from the shared interconnect.

Referring to FIG. 3, a multiprocessor system according to another embodiment of the present invention is shown. In this embodiment, the caches 24, 34 and 44 of each processor node 20, 30, and 40 are respectively segmented into two pans. The first cache segments 24a, 34a and 44a are used to store data previously used or requested by CPUs 22, 32 and 42 respectively. The second cache segments 24b, 34b and 44b are used to store data snarfed off the shared interconnect 12 respectively. When a CPU 22, 32, or 42 needs specific data, the first cache segments 24a, 34a, and 44a are checked respectively. If a hit occurs, the data is immediately transferred to the requesting CPU 22, 32 or 42. If a miss occurs, the second segment 24b, 34b or 44b of the cache is checked. If a hit occurs, the requested data is copied into the corresponding first cache segment 24a, 34a or 44a and immediately made available to the requesting CPU 22, 32 or 42 respectively. Lastly, if the requested data is not in either segment of cache 24, 34 or 44, the data is obtained using a standard read transaction on the shared interconnect 12. In different embodiments of the present invention, the two cache segments can be implemented in a single memory that is segmented into two pans, or it can be implemented by two physically discrete cache memories.

It should be noted that the processor nodes 20, 30, and 40 may use any cache consistency protocol. During operation, the protocol is used to maintain cache coherency and defines a set of shared interconnect transactions for transferring data between the various processor nodes in the multiprocessor system 10. In addition, any cache replacement algorithm may be used, including last recently used, first-in-first-out, or random.

In various embodiments of the present invention, the shared interconnect 12 can be any type of communication link, including buses, rings, point-to-point interconnects, crossbars, MSIN or any other interconnect having a protocol that provides copies of data to a multicast group in the network having an interest in that transaction.

While the present invention has been described in relationship to the embodiments described in the accompanying specification, other alternatives, embodiments and modifications will be apparent to those skilled in the art. It is intended that the specification is only exemplary, and the true scope and spirit of the invention is indicated by the following claims.

What is claimed is:

1. An apparatus configured to be inserted into a multi-processor system having a plurality of data elements and a plurality of processor nodes coupled together by a shared interconnect, the shared interconnect configured to carry a plurality of data elements, the apparatus comprising:

a processor node;

a cache configured to cache a group of the plurality of data elements for the processor node; and a snarfing mechanism, coupled to the cache, the snarfing mechanism, when inserted into the multiprocessor system, configured to check the cache to determine if the cache contains a copy of a data element appearing on the shared interconnect, and further programmed to snarf the data element off the shared interconnect if the cache has no copy of the data element.

2. The apparatus of claim 1, wherein the snarfing mechanism is further configured to snarf the data element off the shared interconnect in the event the cache has an invalid copy of the data element.

3. The apparatus of claim 1, wherein the snarfing mechanism is further configured to not snarf the data element off the shared interconnect in the event the cache has a valid copy of the data element.

4. The apparatus of claim 1, wherein the snarfing mechanism further comprises a program element configured to store program information to program the snarfing mechanism to selectively snarf selected data elements among the plurality of data elements appearing on the shared interconnect in accordance with a selection criteria.

5. The apparatus of claim 4, wherein the selection criteria directs the snarfing mechanism to snarf all the data elements updated and placed on the shared interconnect by a second processor node in the multiprocessor system.

6. The apparatus of claim 4, wherein the selection criteria directs the snarfing mechanism to snarf the data element addressed by a specified memory location.

7. The apparatus of claim 4, wherein the selection criteria directs the snarfing mechanism to snarf a first subset of the plurality data elements generated by processing a first thread in the multiprocessor system and to not scarf a second subset of the plurality data elements generated by processing a second thread in the multiprocessor system.

8. The apparatus of claim 4, wherein the selection criteria directs the snarfing mechanism to snarf the data elements derived from a specified source.

9. The apparatus of claim 4, wherein the selection criteria directs the mechanism to snarf a first subset of the plurality data elements having a first label and to not scarf a second subset of the plurality data elements having a second label.

10. The apparatus of claim 4, wherein the selection criteria directs the snarfing mechanism to snarf the data elements located at a specified memory location.

11. A multiprocessor system having a plurality of data elements and a plurality of processor nodes coupled together by a shared interconnect, the shared interconnect configured to carry a plurality of data elements, each of the processor nodes comprising:

a cache configured to cache a group of the plurality of data elements for the processor node; and a snarfing mechanism, coupled to the cache, the snarfing mechanism, when inserted into the multiprocessor system, configured to check the cache to determine if the cache contains a copy of a data element appearing on the shared interconnect, and further programmed to snarf the data element off the shared interconnect if the cache has no copy of the data element.

12. The apparatus of claim 11, wherein the snarfing mechanism is further configured to snarf the data element off the shared interconnect in the event the cache has an invalid copy of the data element.

13. The apparatus of claim 11, wherein the ,snarfing mechanism is further configured to not snarf the data element off the shared interconnect in the event the cache has a valid copy of the data element.

14. The apparatus of claim 11, wherein the snarfing mechanism further comprises a program element configured to store program information to program the snarfing mechanism to selectively snarf selected data elements among the plurality of data elements appearing on the shared interconnect in accordance with a selection criteria.

15. The apparatus of claim 14, wherein the selection criteria directs the snarfing mechanism to snarf all the data elements updated and placed on the shared interconnect by a second processor node in the multiprocessor system.

16. The apparatus of claim 14, wherein the selection criteria directs the snarfing mechanism to snarf the data element addressed by a specified memory location.

17. The apparatus of claim 14, wherein the selection criteria directs the snarfing mechanism to snarf a first subset of the plurality data elements generated by processing a first thread in the multiprocessor system and to not scarf a second subset of the plurality data elements generated by processing a second thread in the multiprocessor system.

18. The apparatus of claim 14, wherein the selection criteria directs the snarfing mechanism to snarf the data elements derived from a specified source.

19. The apparatus of claim 14, wherein the selection criteria directs the mechanism to snarf a first subset of the plurality data elements having a first label and to not scarf a second subset of the plurality data elements having a second label.

20. A data caching method for a processor node and cache in a multiprocessor system having a plurality of processor nodes coupled together by a shared interconnect, the shared interconnect configured to carry a plurality of data elements, the method comprising the steps of:

providing one of the plurality of data elements over the shared interconnect;

determining if the cache contains a copy of the data element appearing on the shared interconnect;

snarfing the data element off the shared interconnect if the cache has no copy of the data element; and storing the data element snarfed from the shared interconnect in the cache.

21. The method of claim 20, wherein the snarfing step further occurs off the shared interconnect in the event the cache has an invalid copy of the data element.

22. The method of claim 20, wherein the snarfing step does not snarf the data element off the shared interconnect in the event the cache has a valid copy of the data element.

23. The method of claim 20, wherein the snarfing step further snarls selected data elements among the plurality of data elements appearing on the shared interconnect in accordance with a selection criteria.

24. The method of claim 23, wherein the selection criteria causes snarfing of all the data elements updated and placed on the shared interconnect by a second processor node in the multiprocessor system.

25. The method of claim 23, wherein the selection criteria causes the snarfing step to snarl the data element addressed by a specified memory location.

26. The method of claim 23, wherein the selection criteria causes snarfing to occur from a first subset of the plurality data elements generated by processing a first thread in the multiprocessor system and no snarfing to occur from a second subset of the plurality data elements generated by processing a second thread in the multiprocessor system.

27. The method of claim 23, wherein the selection criteria causes snarfing of the data elements derived from a specified source.

28. The method of claim 23, wherein the selection criteria causes the snarfing of a first subset of the plurality data elements having a first label and no snarfing of a second subset of the plurality data elements having a second label.

\* \* \* \* \*